(12) United States Patent
Li et al.

(10) Patent No.: US 9,967,293 B2
(45) Date of Patent: May 8, 2018

(54) FRAMEWORK FOR COMPREHENSIVE MONITORING AND LEARNING CONTEXT OF VOLTE CALL

(71) Applicant: Samsung Electronics Co., Ltd, Suwon-si (KR)

(72) Inventors: Zhiyun Li, Mountain View, CA (US); Yu Wang, Mountain View, CA (US); Pei Zheng, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 106 days.

(21) Appl. No.: 15/040,885

(22) Filed: Feb. 10, 2016

(65) Prior Publication Data
US 2017/0230844 A1    Aug. 10, 2017

(51) Int. Cl.
*H04W 24/02* (2009.01)
*H04L 29/06* (2006.01)
*H04M 7/00* (2006.01)
*H04L 12/26* (2006.01)
*H04W 36/16* (2009.01)
*H04W 36/00* (2009.01)
*H04W 76/02* (2009.01)

(52) U.S. Cl.
CPC .......... *H04L 65/1016* (2013.01); *H04L 43/16* (2013.01); *H04L 65/1069* (2013.01); *H04M 7/006* (2013.01); *H04W 36/0022* (2013.01); *H04W 36/16* (2013.01); *H04W 76/028* (2013.01)

(58) Field of Classification Search
CPC ............ H04W 24/02; H04W 36/0022; H04W 76/028; H04W 36/16; H04L 43/16; H04L 65/1069; H04L 65/1016; H04M 7/006
See application file for complete search history.

(56) References Cited

U.S. PATENT DOCUMENTS

| | | | |
|---|---|---|---|
| 8,331,225 B2 | 12/2012 | Rector et al. | |
| 9,516,557 B2 * | 12/2016 | Zhu | H04W 36/0022 |
| 9,668,184 B1 * | 5/2017 | Ramamurthy | H04W 36/16 |
| 9,686,067 B2 * | 6/2017 | Loehr | H04W 72/0413 |
| 9,763,148 B2 * | 9/2017 | Wong | H04B 17/318 |

(Continued)

OTHER PUBLICATIONS

"Test and Measurement", Anritsu America; http://www.anritsu.com/en-US/test-measurement; Feb. 10, 2016—7 pages.

(Continued)

*Primary Examiner* — Brian O'Connor

(57) ABSTRACT

A method, apparatus, and computer readable medium for managing a voice call in a wireless communication network. The method comprises collecting crowd-sourced data for a voice over long-term evolution (VoLTE) call quality metrics and contexts associated with a VoLTE call. The VoLTE call quality metrics and contexts comprise non-device information and device information. The method further comprises identifying accessible information based on the device information and the non-device information, predicting VoLTE call quality using the collected crowd-sourced data and the accessible information, and determining whether to place the voice call as or switch the voice call to a VoLTE call or a circuit-switched voice call based on comparison of the predicted VoLTE quality to a predetermined threshold.

20 Claims, 7 Drawing Sheets

(56) References Cited

U.S. PATENT DOCUMENTS

| | | | |
|---|---|---|---|
| 2014/0122707 A1 | 5/2014 | de Assuncao et al. | |
| 2016/0353330 A1* | 12/2016 | Naik | H04W 36/0022 |
| 2017/0078171 A1* | 3/2017 | Tapia | H04L 43/08 |
| 2017/0171832 A1* | 6/2017 | Joshi | H04L 65/1006 |
| 2017/0201911 A1* | 7/2017 | Ng | H04W 36/0022 |

OTHER PUBLICATIONS

"Ericsson LTE Radio Access Network", http://www.ericsson.com/ourportfolio/products/lte-radio-access-network—Feb. 10, 2016—2 Pages.

Network Time Machine™ for Service Providers, http://www.flukenetworks.com/telecom-tools/lte-solutions/network-time-machine-service-providers—Feb. 10, 2016—5 Pages.

"Performance Characterization and Call Reliability Diagnosis Support for Voice over LTE", Yunhan Jack Jia et al.; MobiCom '15 Sep. 7-11, 2015 12 Pages.

"QoE Doctor: Diagnosing Mobile App QoE with Automated UI Control and Cross-layer Analysis", Qi Alfred Chen et al.; Nov. 5-7, 2014—14 Pages.

* cited by examiner

FRAMEWORK FOR COMPREHENSIVE MONITORING AND LEARNING CONTEXT OF VOLTE CALL

TECHNICAL FIELD

This disclosure relates generally to wireless communication systems. More specifically, this disclosure relates to a framework for comprehensive monitoring and learning context of VoLTE call.

BACKGROUND

A development of long term evolution (LTE) brings opportunities to both mobile carriers and device original equipment manufacturers (OEMs). According to an increased network capacity and throughput, many new technologies have been emerged. For example, a voice over LTE (VoLTE) technique transmitting voice calls through an LTE network provides salient advantages such as higher efficiency and global roaming. A VoLTE call may provide higher performance metrics than a legacy circuit switching (CS) call and a voice over internet protocol (VoIP) call. However, a reliability of the VoLTE call still lags behind the CS call and the VoIP call. Specifically, a call failure ratio including setup failures and unintended drop situations is almost 5 times higher than legacy calls (e.g., CS call and VoIP call). Therefore, a technique capturing a broader context of VoLTE and learning the correlation pattern between the context and the VoLTE call quality is needed to facilitate more targeted trouble shooting and improve user's calling experience.

SUMMARY

This disclosure provides method and apparatus for comprehensive monitoring and learning context of VoLTE call.

In one embodiment, an apparatus for managing a voice call in a wireless communication network is provided. The apparatus includes a memory and at least one processor operably connected to the memory, the at least one processor configured to identify collected crowd-sourced data for a VoLTE call quality metrics and contexts associated with a VoLTE call. The VoLTE call quality metrics and contexts comprise non-device information and device information. The at least one processor is further configured to identify accessible information based on the device information and the non-device information, generate a prediction of a VoLTE call quality using the collected crowd-sourced data and the accessible information, and determine whether to place the voice call as or switch the voice call to a VoLTE call or a circuit-switched voice call based on comparison of the predicted VoLTE quality to a predetermined threshold.

In another embodiment, a method for managing a voice call in a wireless communication network is provided. The method includes collecting crowd-sourced data for a voice over long-term evolution (VoLTE) call quality metrics and contexts associated with a VoLTE call. The VoLTE call quality metrics and contexts comprise non-device information and device information. The method further includes identifying accessible information based on the device information and the non-device information, predicting VoLTE call quality using the collected crowd-sourced data and the accessible information, and determining whether to place the voice call as or switch the voice call to a VoLTE call or a circuit-switched voice call based on comparison of the predicted VoLTE quality to a predetermined threshold.

In another embodiment, a non-transitory computer readable medium is provided. The non-transitory computer readable medium include a program code, that when executed by at least one processor, causes the at least one processor to collect crowd-sourced data for a voice over long-term evolution (VoLTE) call quality metrics and contexts associated with a VoLTE call. The VoLTE call quality metrics and contexts comprise non-device information and device information. The non-transitory computer readable medium further includes a program code, that when executed by at least one processor, causes the at least one processor to identify accessible information based on the device information and the non-device information, generate a prediction of a VoLTE call quality using the collected crowd-sourced data and the accessible information, and determine whether to place the voice call as or switch the voice call to a VoLTE call or a circuit-switched voice call based on comparison of the predicted VoLTE quality to a predetermined threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The descriptions of FIGS. 1-4 are not meant to imply physical or architectural limitations to the manner in which different embodiments may be implemented. Different embodiments of the present disclosure may be implemented in any suitably-arranged communications system.

Figure 1:
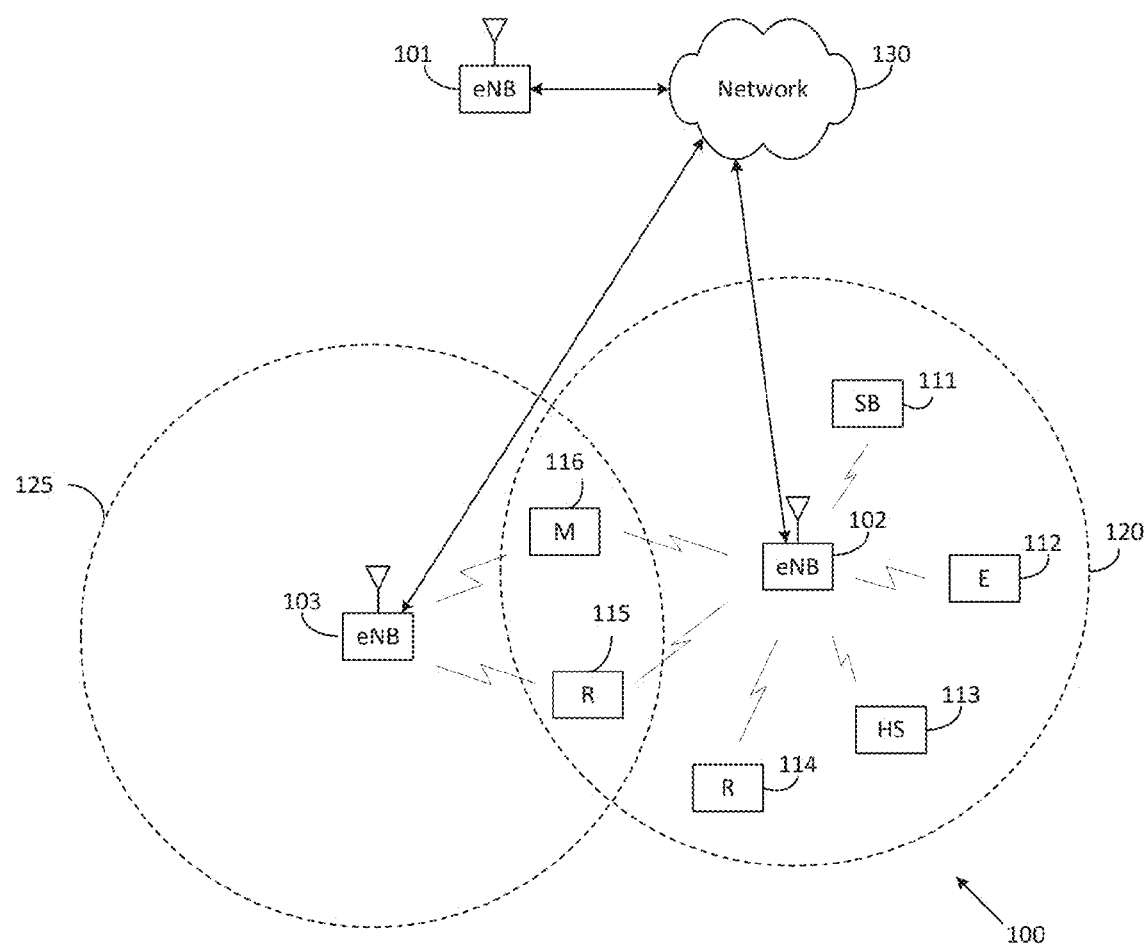
FIG. 1 illustrates an example wireless network according to embodiments of the present disclosure.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for transmitting a context of VoLTE call. In certain embodiments, and one or more of the eNBs 101-103 includes circuitry, programming, or a combination thereof, for processing of monitoring and learning context of VoLTE call.

In some embodiments, crowd-sourced data may be used for a VoLTE call quality metrics and contexts associated with a VoLTE call. More specifically, the VoLTE call quality metrics and contexts comprise non-device information and device information. In one embodiment, the non-device information includes at least one of a call number, a call state, a type of network, a band number, and a signal strength and quality. In addition, the device information comprises accessible information and inaccessible information. More specification, the accessible information comprises at least one of motion sensor readings, battery usage, heat generation, memory usage, a central processing unit state, a screen state, a button response time, and application internet traffic, and the inaccessible information comprises at least one of a modulation scheme, a modem power amplifier voltage, antenna operational frequency, signal strength and quality for a user equipment with multiple antennas, and an indication of signal orthogonality. In such embodiments, accessible information may be identified based on device information and non-device information.

In such embodiments, VoLTE call quality is predicted using collected crowd-sourced data. For example, a correlation pattern between the VoLTE call quality and contexts is used to predict the VoLTE call quality based on a prediction model and inaccessible information from the device information based on the accessible information of the device information and the non-device information is predicted. In such embodiments, inaccessible information is estimated based on the prediction model using a machine learning algorithm of a machine learning engine. In addition, the machine learning algorithm is at least one of a support vector machine algorithm and a random forest algorithm that are used for the machine learning engine by applying off-the-shelf algorithms. In such embodiments, a voice call is placed using either a VoLTE call or a circuit-switched call or an existing call is switched from one of a VoLTE call or a circuit-switched call to the other of the VoLTE call or the circuit-switched call based on comparison a predetermined threshold with the predicted VoLTE call quality.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
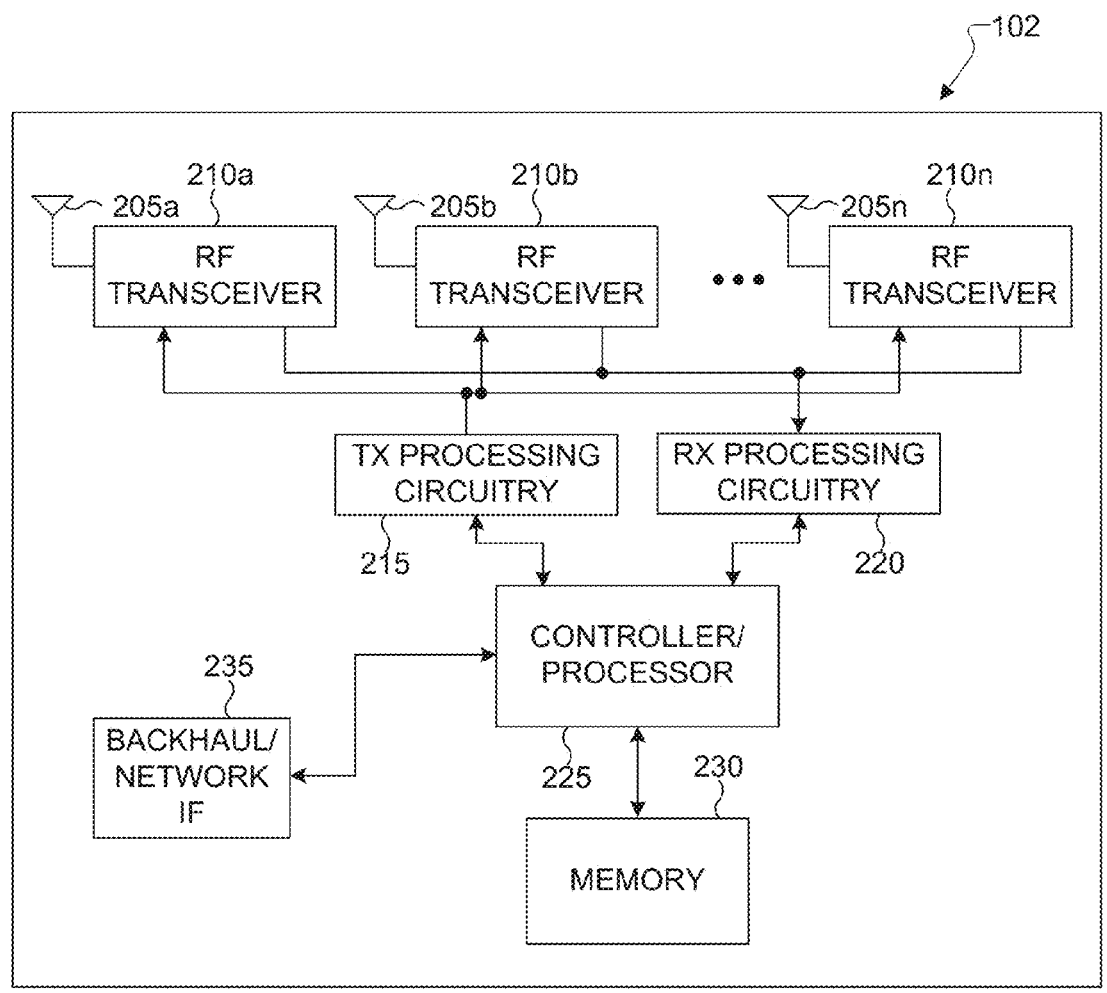
FIG. 2 illustrates an example eNodeB (eNB) according to embodiments of the present disclosure.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

In some embodiments, the controller/processor 225 is configured to collect crowd-sourced data for a voice over long-term evolution (VoLTE) call quality metrics and contexts associated with a VoLTE call that comprise non-device information and device information, identify accessible information based on the device information and the non-device information, predict VoLTE call quality using the collected crowd-sourced data, and determine whether to place the voice call as or switch the voice call to a VoLTE call or a circuit-switched voice call based on comparison of the predicted VoLTE quality to a predetermined threshold. In some embodiments, the controller/processor 225 is further configured to generate a prediction model, determine a correlation pattern between the VoLTE call quality and contexts to predict the VoLTE call quality based on the prediction model, and estimate inaccessible information from the device information based on the accessible information of the device information and the non-device information.

As described in more detail below, the eNB 102 includes circuitry, programming, or a combination thereof for monitoring and learning context of VoLTE call. In some embodiment, the eNBs 102 includes a server to monitor and learn contexts of VoLTE call. In some embodiments, a server that monitors and learns contexts of VoLTE call is implemented in an independent system that may be connected to the eNB 102.

For example, controller/processor 225 can be configured to execute one or more instructions, stored in memory 230, that are configured to cause the controller/processor to monitor and learn context of VoLTE call.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM. In some embodiments, the memory 230 may store a program code, that when executed by at least one controller/processor 410, causes the at least one processor to collect crowd-sourced data for a VoLTE call quality metrics and contexts associated with a VoLTE call, identify accessible information based on the device information and the non-device information, predict VoLTE call quality using the collected crowd-sourced data, and determine whether to place the voice call as or switch the voice call to a VoLTE call or a circuit-switched voice call based on comparison of the predicted VoLTE quality to a predetermined threshold.

In such embodiment, the memory 230 may store a program code, that when executed by at least one controller/processor 410, cause the at least one processor to generate a prediction model, determine a correlation pattern between the VoLTE call quality and contexts to predict the VoLTE call quality based on the prediction model, and estimate inaccessible information from the device information based on the accessible information of the device information and the non-device information. In such embodiment, the memory 230 may store a program code, that when executed by the at least one processor, causes the at least one processor to perform prediction based on the prediction model using a machine learning algorithm of a machine learning engine. In such embodiments, the memory 230 may store a program code, that when executed by at least one controller/processor 410, cause the at least one processor to switch the voice call to a circuit-switched voice call based on comparison of the predicted VoLTE call quality to a predetermined threshold.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
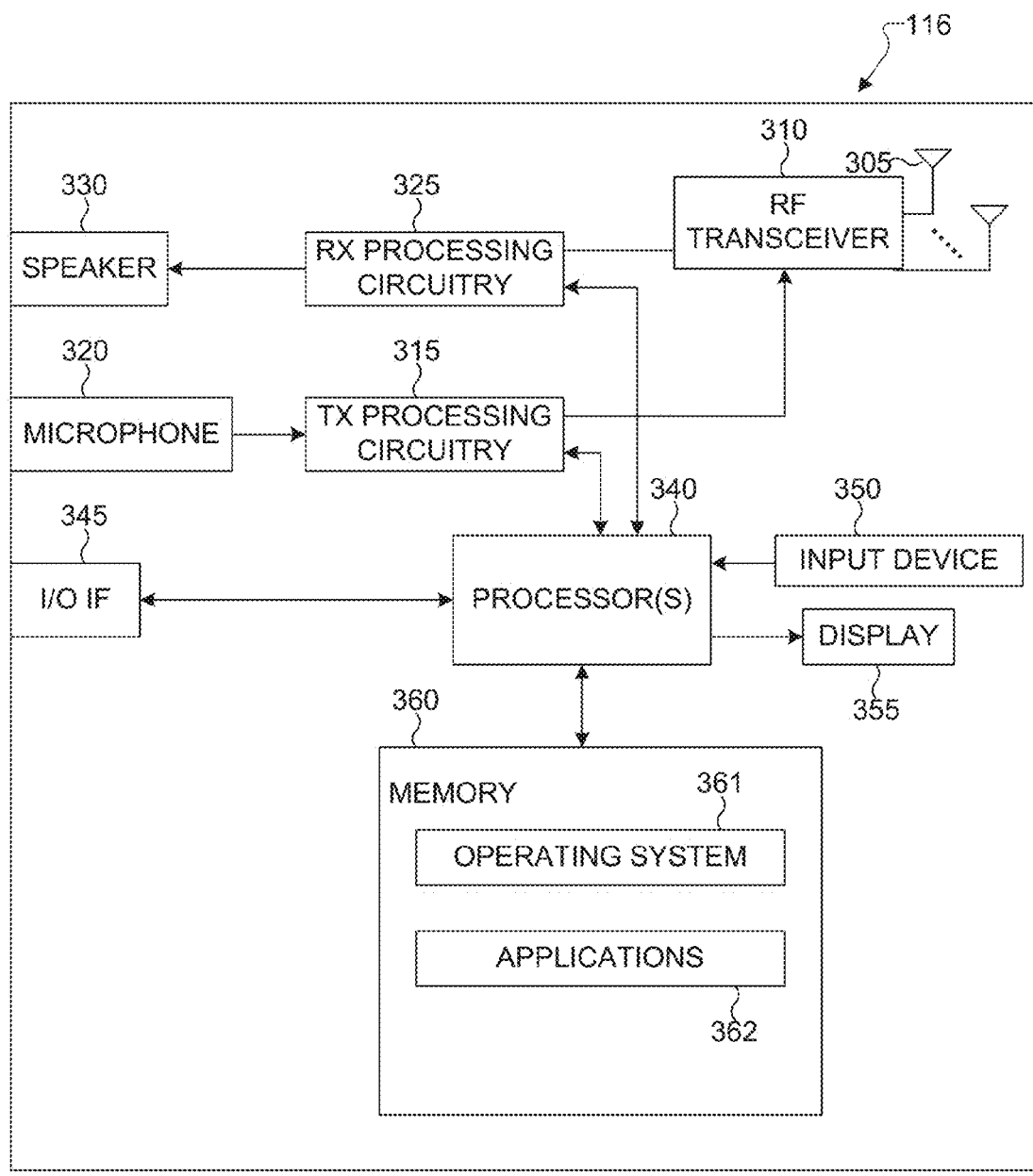
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes a context of VoLTE call for the eNBs 101-103. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites. In some embodiments, the processor 340 is configured to transmit crowd-sourced data for a voice over long-term evolution (VoLTE) call quality metrics and contexts associated with a VoLTE call that comprise device information including accessible information and inaccessible information.

The memory 360 is coupled to the processor 340. Part of the memory 360 could include a random access memory (RAM), and another part of the memory 360 could include a Flash memory or other read-only memory (ROM). In some embodiments, the memory 360 may store a program code, that when executed by at least one controller/processor 340, causes the at least one processor to transmit crowd-sourced data for a VoLTE call quality metrics and contexts associated with a VoLTE call that comprises device information including accessible information and inaccessible information.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, only one antenna may be used in set of antennas 305. Also, while FIG. 3 illustrates the UE 116 configured as a mobile telephone or smartphone, UEs could be configured to operate as other types of mobile or stationary devices.

Figure 4:
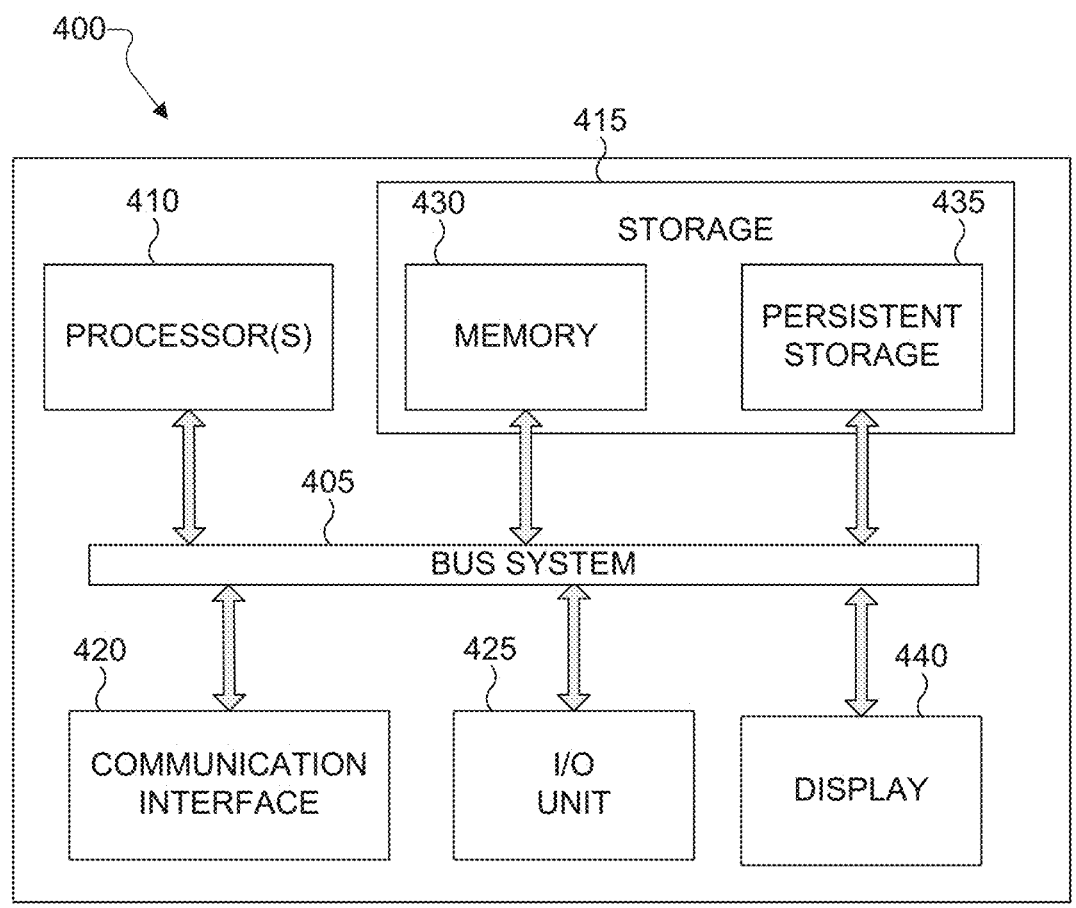
FIG. 4 illustrates an example server in a computing system according to embodiments of the present disclosure.

FIG. 4 illustrates an example server 400 in a computing system according to embodiments of the present disclosure. As illustrated in FIG. 4, a server 400 could represent the eNBs 101, 102, 103 in FIG. 1. In one embodiment, the server 400 could be deployed as an internal that is installed in the eNBs 101, 102, 103. In another embodiment, the server 400 could be deployed as an external device for the eNBs 101, 102, 103.

As shown in FIG. 4, the server 400 includes a bus system 405, which supports communication between at least one processor 410, at least one storage 415, at least one communication interface 420, at least one input/output (I/O) unit 425, and at least one display 440.

The processor 410 executes instructions that may be loaded into a memory 430. The processor 410 may include any suitable number(s) and type(s) of processors or other devices in any suitable arrangement. Example types of the processor 410 include microprocessors, microcontrollers, digital signal processors, field programmable gate arrays, application specific integrated circuits, discreet circuitry, and video stream processors.

In some embodiments, the processor 410 is configured to collect crowd-sourced data for a voice over long-term evolution (VoLTE) call quality metrics and contexts associated with a VoLTE call that comprise non-device information and device information, identify accessible information based on the device information and the non-device information, predict VoLTE call quality using the collected crowd-sourced data, and determine whether to place the voice call as or switch the voice call to a VoLTE call or a circuit-switched voice call based on comparison of the predicted VoLTE quality to a predetermined threshold. In some embodiments, the controller/processor 410 is further configured to generate a prediction model, determine a correlation pattern between the VoLTE call quality and contexts to predict the VoLTE call quality based on the prediction model, and estimate inaccessible information from the device information based on the accessible information of the device information and the non-device information.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, flash memory, or optical disc. The display 440 may include a panel, a hologram device, or a projector to display any object (such as a text, a video, an image, a graphic and/or other suitable information).

In some embodiments, the storage 415 may store a program code, that when executed by at least one controller/processor 410, causes the at least one processor to collect crowd-sourced data for a VoLTE call quality metrics and contexts associated with a VoLTE call, identify accessible information based on the device information and the non-device information, predict VoLTE call quality using the collected crowd-sourced data, and determine whether to place the voice call as or switch the voice call to a VoLTE call or a circuit-switched voice call based on comparison of the predicted VoLTE quality to a predetermined threshold. In such embodiment, the storage 415 may store a program code, that when executed by at least one controller/processor 410, cause the at least one processor to generate a prediction model, determine a correlation pattern between the VoLTE call quality and contexts to predict the VoLTE call quality based on the prediction model, and estimate inaccessible information from the device information based on the accessible information of the device information and the non-device information. In such embodiment, the storage 415 may store a program code, that when executed by the at least one processor, causes the at least one processor to perform prediction based on the prediction model using a machine learning algorithm of a machine learning engine. In such embodiments, the storage 415 may store a program code, that when executed by at least one controller/processor 410, cause the at least one processor to place the voice call as or switch the voice call to a VoLTE call or a circuit-switched voice call based on comparison of the predicted VoLTE quality to a predetermined threshold.

The communication interface 420 supports communications with other systems or devices. For example, the communication interface 420 could include a network interface card or a wireless transceiver facilitating communications over the network 100. The communication interface 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 400 of FIG. 4, the same or similar structure could be used in one or more of the client devices 111-116 as illustrated in FIG. 1. For example, a laptop or desktop computer could have the same or similar structure as that shown in FIG. 4. Any of these types of devices may implement the above discussed features of the server 400.

A development of LTE brings opportunities to both mobile carriers and device OEMs. According to an increased network capacity and throughput, many new technologies have been emerged. Specifically, transmitting voice calls through the LTE provides salient advantages such as a higher efficiency and global roaming.

A VoLTE call may provide higher performance metrics than a legacy circuit switching (CS) call and a voice over internet protocol (VoIP) call. However, a reliability of the VoLTE call still lags behind the CS call and the VoIP call. Specifically, a call failure ratio including setup failures and unintended drop situations is almost 5 times higher than legacy calls (e.g., CS call and VoIP call). Such an issue can severely impair user experience. Moreover, a reliability issue varies across carrier networks and device models. For example, some device models can achieve noticeable improvement in the call reliability after disabling VoLTE call.

Because the VoLTE call deployment is still in an early stage, many problems need to be investigated and resolved. For example, a VoLTE call performance varies among different carrier networks and device models. With the same network and device, a VoLTE call may experience random setup failures, unintended drops, and poor quality. These issues severely impair user experience and may eventually lead to user returning the device. In one embodiment, a broader context of VoLTE call is captured to learn the correlation pattern between context and the VoLTE call quality in order to facilitate more targeted troubleshooting and improve user's calling experiences.

A VoLTE call quality is much more challenging to manage than legacy CS calls from points of carrier side (e.g., operator, network) and device side (UE). For example, in carrier side, a network capacity, coverage, signal strength, and a server's stability and performance need to be considered. In device side, communication modules such as control plane (CP), IP multimedia subsystem (IMS) stack implementation, a modem, and an antenna performance etc. need to be considered.

While significant engineering efforts have been made to improve VoLTE coverage, performance and robustness for both on a network side and a device side, there are major limitations of the current approaches. For example, all issues may not be fixed quickly because VoLTE network deployment and improvement are on-going processes. Because a carrier's trouble-shooting process is largely based on user's feedback to customer service center and limited information is collected from users, a huge waste of time may be needed to process the user's feedback. In addition, the device is hard to modify once released to market because the device is caused by a hardware (such as antenna, modem) or even a form factor (such as metal case). There are other unknown bugs or little-studied factors to impact VoLTE call quality. Although there are existing methods (e.g., Fluke Network Time Machine) to detect VoLTE capability, but these existing methods are only very small parts of the complicated system to determine the VoLTE call quality.

Given that VoLTE call quality issues will continue to exist for an extended period of time, there is an urgent need to collect and understand a broader context of a VoLTE call, learn a correlation pattern between the context and VoLTE call quality. In one embodiment, more targeted troubleshooting scenario and contextual insights are provided to reveal hard-to-find VoLTE issues. In another embodiment, user's calling experience by proactively avoiding a VoLTE call is improved when the VoLTE call drop risk is high based on learned correlation patterns. In such embodiment, user's calling experience is especially useful for already released mobile devices in the currently imperfect VoLTE network.

In one embodiment, an environmental context is needed to improve VoLTE call quality and performance. For example, user A living on the hill complains about frequent VoLTE call drops at night around 10 pm. A usual approach is to send field engineers to that area to test the scenario, in the hope to isolate the issue. But sending the field engineers to that area may not be cost-effect remedy. Therefore, users' context data (such as geo-location, time of the day, weather, phone model, etc.) may be monitored to provide efficient remedy for such situation. This monitoring can happen on many users and the data may be collected together with VoLTE call quality metrics. With all the crowd-sourced context data and the VoLTE call quality metrics recorded by a carrier, a machine learning system can be applied to learn the correlation pattern between the context and VoLTE call quality. In such embodiments, some patterns to monitor users' calls can be collected. For example, if a phone (e.g., user) is near an edge or shadow of LTE coverage and calling at night time around 10 pm, the weather is raining, and the phone has a metal case, then the VoLTE call quality is expected to be poor. According to such pattern, it may be expected that another user (such as user B) who lives in a different location but matches with this pattern may most likely have poor VoLTE quality. Therefore, a CS call may be provided to override VoLTE call for better experience.

In another embodiment, an application behavior context is needed to improve VoLTE call quality and performance. As VoLTE call quality depends on antenna performance, behaviors of many other applications also depend on the antenna performance. For example, if a user often has issues of uploading photos to a cloud or playing online videos, the user may retries with the same request or data to upload photos or play the online videos. And the user may switch back and forth between a WiFi and a cellular connection. All of this behavioral context can be monitored for many users. Together with the VoLTE call quality metrics recorded by a carrier, a correlation pattern can be learned. With this pattern, it may be predict that a new user may have poor VoLTE call quality if the new user's phone has the similar behavioral context for those applications.

In conventional schemes, a feedback from a user may be used to troubleshoot some problems. However, the feedback from the user may not provide reliability. In addition, the feedback from the user may not be sufficient to characterize some problems. Therefore, the feedback from the user may not be used for a LTE network. In one example, a network monitoring device may be used. However, the network monitoring device provides only log network side information and cannot capture device side information. Furthermore, the network monitoring device usually requires a slow and tedious process to reproduce problems on a device before troubleshooting.

In some embodiments, a context-based machine learning system on crowd-sourced data is used to provide deeper insight of the hidden issues. In one example, VoLTE call quality/drop statistics and context data from many user devices and network during a period of time are collected to improve VoLTE call quality and performance. In such example, carriers normally have system to record carrier's network states for diagnostic purpose. However, because a network is just one of many factors, call quality issues often happen on specific mobile devices in specific scenarios even on the identical network. Therefore, all users' related contexts are provided to improve VoLTE call quality and performance (e.g., a context-based machine learning system). For example, a certain geo-location region, a time of the day, a clustering of active users, a moving state, data activity, battery level, device type and model, active apps, network traffic patterns, etc. may be provided from the user.

In some embodiments, a machine learning engine is used to find an optimal prediction model through machine learning algorithms to learn the correlation pattern between VoLTE call quality and context. Conventionally, a support vector machine (SVM) and a random forest (RF) algorithms are used for the machine learning engine by applying off-the-shelf algorithms to data. In such embodiment, a prediction model M is used to predict VoLTE call quality based on measured context at any moment for any devices.

In some embodiments, a prediction model M that is obtained from a machine learning engine can be applied to an individual mobile device. In such embodiment, the prediction model M may automatically predict a VoLTE call quality/drop risk based on measured contexts, and then determine whether a call needs to go through CS or a VoLTE network.

In some embodiments, VoLTE call quality and a VoLTE call's context correlation pattern may keep changing over time since carriers (e.g., operators, network) keep increasing coverage, tuning performance, and fixing issues. By creating a feedback loop (such as adaptive updating loop) for the aforementioned three components (such as increasing coverage, tuning performance, fixing issues), an optimal balance may be achieved between a VoLTE deployment and overall calling experience in real-life, and also unnecessary device returns may be reduced.

In some embodiments, a machine learning process can also correlate context with device side issues (such as modem or antenna, etc.) with a prediction model M. The context with the device side issues may be significantly more efficient than talking with customers through customer service centers. Some device side information that cannot be accessed directly on user's device, in this case, the prediction model M may be used to infer the device side information.

Figure 5:
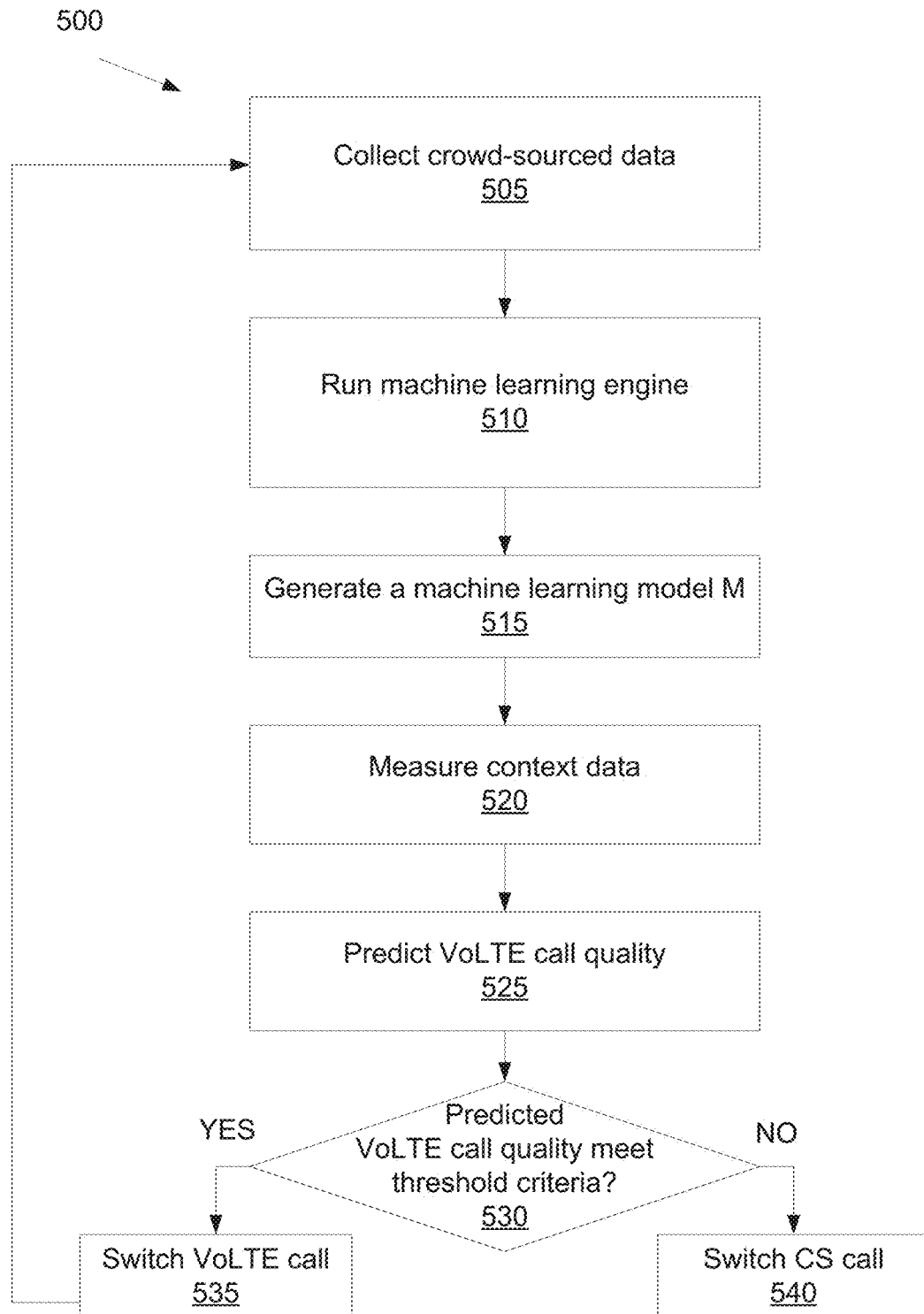
FIG. 5 illustrates a flow chart of a method for monitoring context to predict voice over long term evolution (VoLTE) call quality according to embodiments of the present disclosure.

FIG. 5 illustrates a flow chart of a method 500 for monitoring context to predict VoLTE call quality according to embodiments of the present disclosure, as may be performed by a server (such as 400 illustrated in FIG. 4). The server 400 may be implemented on eNBs 101, 102, 103, as an external device in the network 130, or an external device that is connected to the eNBs 101, 102, 103. The embodiment of the method 500 illustrated in FIG. 5 is for illustration only, and the method 500 of FIG. 5 could have the same or similar configuration. Also, various components in FIG. 5 could be combined, further subdivided, or omitted and additional components could be added according to particular needs, and FIG. 5 does not limit the scope of this disclosure to any particular implementation of the method for monitoring context to predict VoLTE call quality. FIG. 5 does not limit the location of the server that may be implemented in a wireless communication network for monitoring context to predict VoLTE call quality.

As illustrated FIG. 5, the method 500 begins at block 505, where the server 400 collects crow-sourced data from many users (such as user devices 111-116 illustrated in FIG. 1). More specifically, the server 400 collects VoLTE call quality metrics and various contexts from the users 111-116. Next, the server 400 runs a machine learning engine at block 510 to learn correlation between the VoLTE call quality metrics and the various contexts that are collected from the crowd-sourced data at block 505. Next, at block 515, the server 400 generates a machine learning model M according to the correlation between the VoLTE call quality and the various contexts. Subsequently, the server 400 generates a machine learning model M through the machine learning engine at block 515. Subsequently, the server 400, at block 520, measures the context data obtained from users using the machine learning model M. Subsequently, the server 400 predicts the VoLTE call quality at block 525. At block 530, if the predicted VoLTE call quality meets threshold criteria, the server 400 switches a call of the user to VoLTE call at block 535, and then the server 400 performs block 505. For example, the threshold criteria include one or more thresholds that, if met or exceeded, are expected to provide the user with a good quality VoLTE call. If the predicted VoLTE call quality does not meet threshold criteria, the server 400 switches a call of the user to CS call at block 540.

Figure 6:
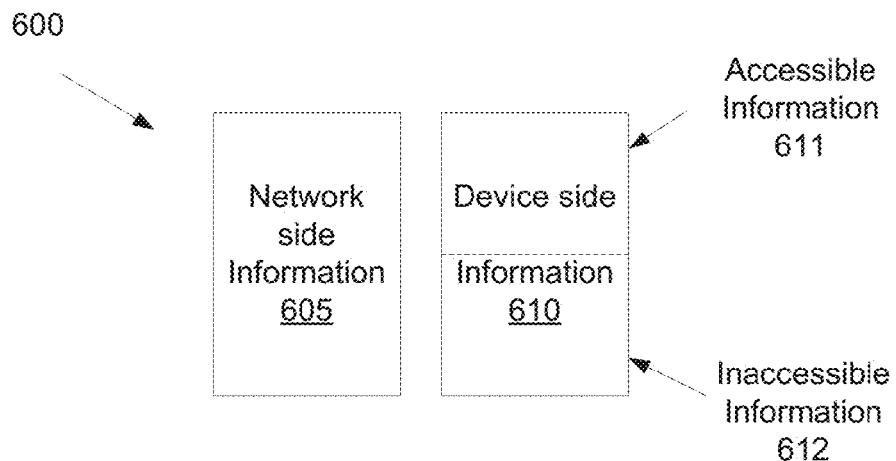
FIG. 6 illustrates an example monitoring context to infer inaccessible information according to embodiments of the present disclosure.

FIG. 6 illustrates an example monitoring context 600 to infer inaccessible information according to embodiments of the present disclosure. The embodiment of the monitoring context 600 illustrated in FIG. 6 is for illustration only, and the monitoring context 600 of FIG. 6 could have the same or similar configuration. Also, various components in FIG. 6 could be combined, further subdivided, or omitted and additional components could be added according to particular needs, and FIG. 6 does not limit the scope of this disclosure to any particular implementation of the monitoring context.

As illustrated in FIG. 6, a context comprises a network side information 605 and device side information 610 including accessible information 611 and inaccessible information 612. More specifically, the network side information 605 includes, but is not limited to, a call number, a call state (such as attempting, established, connected, held, ended, muted, incoming, circuit switched fallback (CSFB) state, single radio voice call continuity (SRVCC) state, evolved packet data gateway (ePDG) state, etc.), a type of networks (e.g., long-term evolution (LTE), WFC2, WFC1, 3G, 2G, etc.), a band number, signal strength/quality (e.g., received signal strength indicator (RSSI), received signal code power (RSCP), energy over interference (Ec\Io), reference signal received power (RSRP), reference signal received quality (RSRQ), signal to noise ratio (SNR), signal to interference plus noise ratio (SINR), etc.). The network side information 605 characterizes a network condition during a call.

A mobile device is typically composed by three fundamental building blocks such as an application processor (AP), a cellular processor (CP), and a graphical processor (GP). The CP integrates components (such as modem, RF frontend, etc.) to connect with a cellular network. In addition, the CP communicates with an operating system (e.g., Android, iOS, etc.) running on the AP. The device side information 610 characterizes a device condition during a call.

The accessible information 611 of the device side information 610 includes contents and accessibility. For example, the content includes, but is not limited to, motion sensor readings, a battery usage, a heat generation, a memory usage, a CPU state, a screen state, a button response time, an application Internet traffic, etc.

More specifically, content information of the accessible information 611 can facilitate a troubleshooting. For example, if a user suffers from poor VoLTE call quality but has no problem using other applications/services that require data traffic (such as uploading files to Dropbox, watching video on YouTube, etc.), the user suffers caused by bearer related issues such as quality of service (QoS) class identifier (QCI) mismatching for assigned bearers. This problem is caused by a priority issue in VoLTE service because a voice call is considered to use a bearer with a higher priority than normal data traffic. In addition, accessibility of the accessible information 611 is usually maintained by the AP that can be directly accessed through corresponding application platform interfaces (APIs).

The inaccessible information 612 of the device side information 610 also includes content and accessibility information. Content information of the inaccessible information 612 includes, but is not limited to, a modulation scheme (e.g., binary phase shift keying (BPSK)), quadrature phase shift keying (QPSK), 8 phase shift keying (8PSK), 17 quadrature amplitude modulation (16QAM, 32QAM, 64QAM, etc.), a modem power amplifier voltage, an antenna operational frequency, strength/quality of each multipath signal for a UE with multiple antennas, an indication of signal orthogonality, etc. In addition, accessibility of the inaccessible information 612 is usually maintained by the CP that does not grant a direct access.

Figure 7:
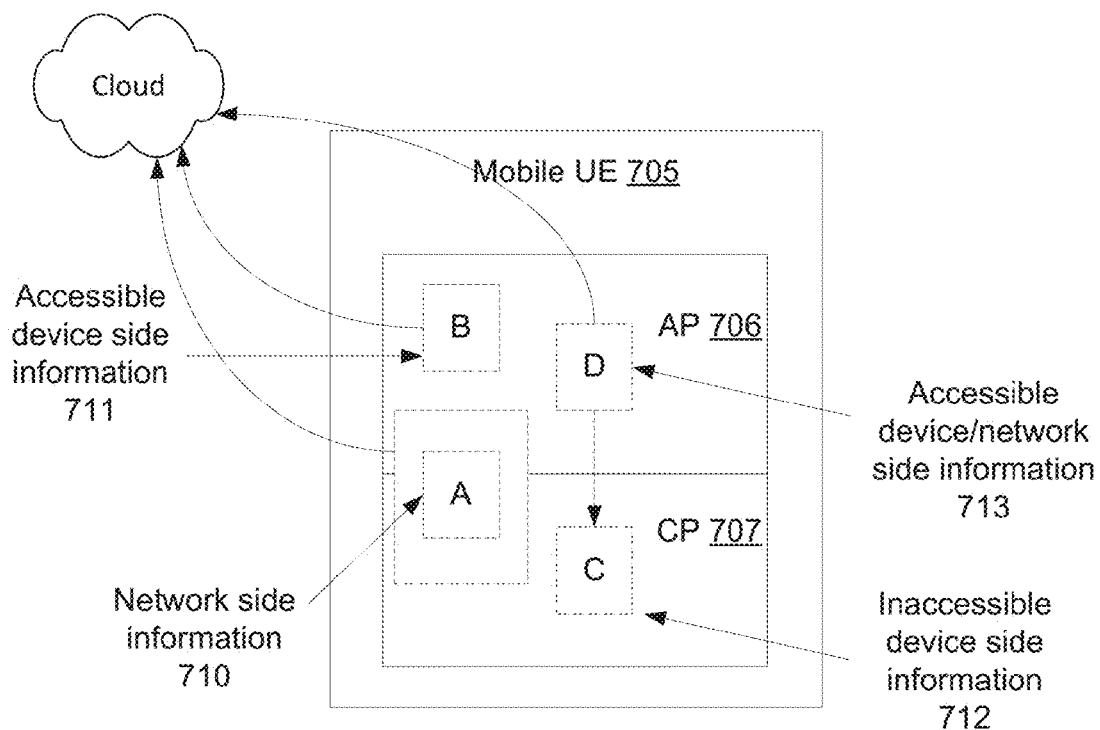
FIG. 7 illustrates an example VoLTE related information according to embodiments of the present disclosure.

FIG. 7 illustrates an example of VoLTE related information 700 according to embodiments of the present disclosure. The embodiment of the VoLTE related information 700 illustrated in FIG. 7 is for illustration only, and the VoLTE related information 700 of FIG. 7 could have the same or similar configuration. Also, various components in FIG. 7 could be combined, further subdivided, or omitted and additional components could be added according to particular needs, and FIG. 7 does not limit the scope of this disclosure to any particular implementation of the VoLTE related information.

As illustrated in FIG. 7, VoLTE related information on the mobile UE 705 includes network side information A 710, accessible device side information B 711, and inaccessible device side information C 712. In some embodiments, all the network side information A 710, the accessible device side information B 711, and inaccessible device side information C 712 are used to monitor a VoLTE call.

In such embodiments, the network side information A 710 is part of carrier collected information and can be obtained by leveraging existing carrier diagnostic capability. In such embodiments, the accessible device side information B 711 can be easily measured by calling the corresponding APIs and obtained by integrating to carrier diagnostic services.

In one embodiment, the inaccessible device side information C 712 is inferred by a machine-learning-based approach. For example, some accessible device/network information D 713 may be obtained by the machine-learning-based approach. More specifically, the accessible device/network information D 713 can well characterize the inaccessible device side information C 712 and trains the machine-learning-based model accordingly.

Such embodiments can be conducted using (modified) UE via offline experiments. Therefore, although having no direct access to the inaccessible device side information C 712, the UE can log the accessible device/network information D 713 and infer the inaccessible device side information C 712 based on the machine-learning-based approach mode. A UE generates thousands of states at runtime. However, it is unlikely that all the data is relevant to the target information C 712 (such as inaccessible device side information). Furthermore, a machine learning algorithms can be adversely affected by too much irrelevant and/or redundant input data. Therefore, a subset of data (such as accessible device/network information D 713) that can well characterize the target information C 712 (such as inaccessible device side information) is effectively selected.

In such embodiment, the accessible device/network information D 713 is iteratively selected. Specifically, a candidate subset of the accessible device/network information D 713 is obtained from a candidate subset of accessible states, and then is modified by adding another state. The candidate subset of the accessible device/network information D 713 is evaluated if a new subset (such as the candidate of the accessible device/network information D 713) outperforms the previous subset. An evaluation of a subset is performed based on correlation between predicted information by a machine learning classifier (such as SVM) and the target information C 712 (such as inaccessible device side information). In one embodiment, an iterative process terminates when a correlation of a subset exceeds a pre-defined threshold.

In some embodiments, a UE typically integrates a primary antenna and a diversity antenna, where the primary antenna transmits (such as uploading) and receives (such as downloading) data and the diversity antenna only receives data. If the primary antenna on the UE works abnormally (not necessarily lead to decreased network throughput), a VoLTE call quality is degraded and impaired. Accordingly, a user (such as the UE) can hear normally but the user's voice cannot be effectively transmitted to a user in communicating with the user (such as the callee) over a communication network. Therefore, performance of applications/services that require upload data traffic (such as uploading files to Dropbox) is deteriorated, but a performance of applications/services that require download data traffic (such as watching video on YouTube) is normally provided as an indication of the primary antenna malfunction because the diversity antenna on the UE can make up the download performance loss.

Figure 8:
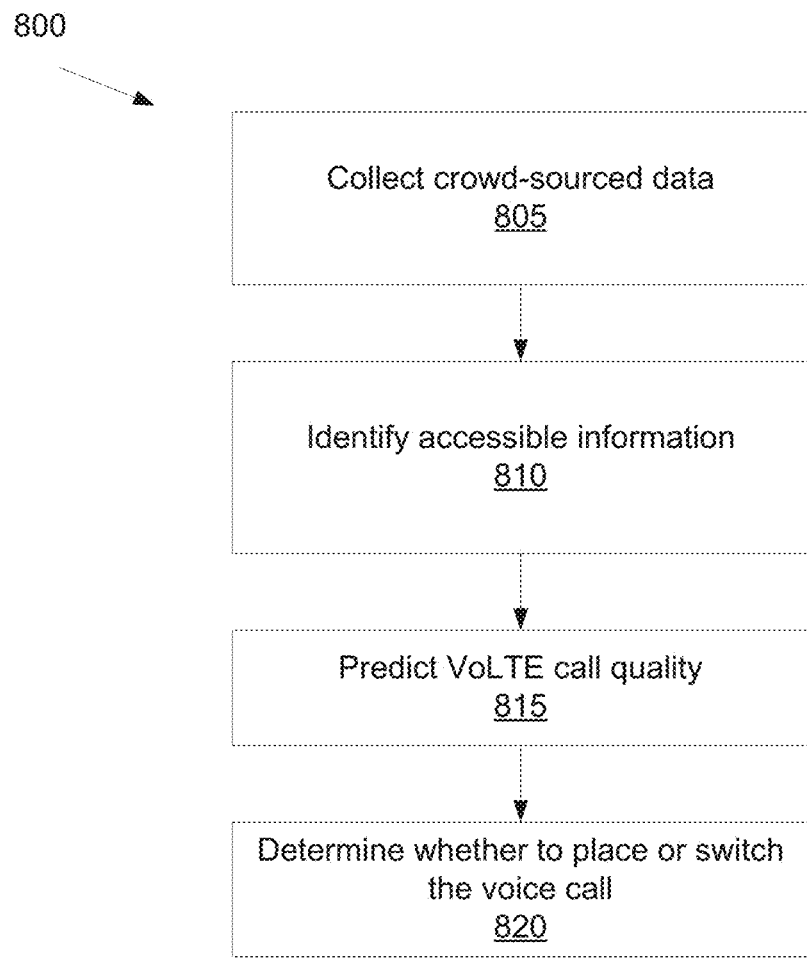
FIG. 8 illustrates a flow chart of a method for monitoring context of VoLTE call according to embodiments of the present disclosure.

FIG. 8 illustrates a flow chart of a method 800 for monitoring context of VoLTE call according to embodiments of the present disclosure, as may be performed by a server (such as 400 illustrated in FIG. 4). The server 400 may be implemented on eNBs 101, 102, 103, as an external device in the network 130, or an external device that is connected to the eNBs 101, 102, 103. The embodiment of the method 800 illustrated in FIG. 8 is for illustration only, and the method 800 of FIG. 8 could have the same or similar configuration. Also, various components in FIG. 8 could be combined, further subdivided, or omitted and additional components could be added according to particular needs, and FIG. 8 does not limit the scope of this disclosure to any particular implementation of the method 800 for monitoring context of VoLTE call.

As illustrated in FIG. 8, the method 800 begins at block 805, wherein the server 400 collects crowd-sourced data for a VoLTE call quality metrics and contexts associated with a VoLTE call. More specifically, the VoLTE call quality metrics and contexts comprise non-device information and device information. In one embodiment, the non-device information includes at least one of a call number, a call state, a type of network, a band number, and a signal strength and quality. In addition, the device information comprises accessible information and inaccessible information. More specification, the accessible information comprises at least one of motion sensor readings, battery usage, heat generation, memory usage, a central processing unit state, a screen state, a button response time, and application internet traffic, and the inaccessible information comprises at least one of a modulation scheme, a modem power amplifier voltage, antenna operational frequency, signal strength and quality for a user equipment with multiple antennas, and an indication of signal orthogonality.

Next, the server 400 identifies accessible information based on the device information and the non-device information at block 810. Subsequently, the method 800 predicts VoLTE call quality using the collected crowd-sourced data at block 815. More specifically, the method 800 at block 815 generates a prediction model and determines a correlation pattern between the VoLTE call quality and contexts to predict the VoLTE call quality based on the prediction model. In addition, the method 800 estimates inaccessible information from the device information based on the accessible information of the device information and the non-device information. In one embodiment, the estimation of the inaccessible information is performed based on the prediction model using a machine learning algorithm of a machine learning engine. In such embodiment, the machine learning algorithm is at least one of a support vector machine algorithm and a random forest algorithm that are used for the machine learning engine by applying off-the-shelf algorithms.

At block 820, the server 400 determines whether to place the voice call as or switch the voice call to the VoLTE call or the circuit-switched call based on comparison of the predicted VoLTE call quality a predetermined threshold. For example, the call may be initially placed using VoLTE if the VoLTE call is predicted to have an acceptable call quality and using a circuit-switch call if not. In another example, a placed and on-going voice call (e.g., VoLTE call or circuit-switch call) may be switched from VoLTE to circuit switch and vice versa as a result of the predicted VoLTE call quality. The predicted VoLTE call quality may also be dynamically updated and calculated throughout the call to determine a point in time when the call is switched and may be switched back and forth autonomously.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. An apparatus for managing a voice call in a wireless communication network, the apparatus comprising:
a memory; and
at least one processor operably connected to the memory, the at least one processor configured to:
identify collected crowd-sourced data including a correlation pattern between voice over long-term evolution (VoLTE) call quality metrics and device contexts, wherein the VoLTE call quality metrics and the device contexts comprise network information and device information;
identify accessible information based on the device information and the network information;
generate a prediction of a VoLTE call quality using the collected crowd-sourced data and the accessible information; and
determine whether to place the voice call as or switch the voice call to the VoLTE call or a circuit-switched voice call based on comparison of the predicted VoLTE quality to a predetermined threshold.

2. The apparatus of claim 1, wherein to generate the prediction of the VoLTE call quality, the at least one processor is further configured to:
generate a prediction model based on the correlation pattern included in the collected crowd-sourced data; and
estimate inaccessible information from the device information based on the accessible information of the device information and the network information.

3. The apparatus of claim 2, wherein to estimate the inaccessible information, the at least one processor is further configured to perform prediction based on the prediction model using a machine learning algorithm of a machine learning engine.

4. The apparatus of claim 3, wherein the machine learning algorithm is at least one of a support vector machine algorithm and a random forest algorithm that are used for the machine learning engine.

5. The apparatus of claim 2, wherein the inaccessible information of the device information includes at least one of a modulation scheme, a modem power amplifier voltage, antenna operational frequency, signal strength and quality for a user equipment with multiple antennas, and an indication of signal orthogonality.

6. The apparatus of claim 1, wherein the at least one processor is further configured to switch the voice call from the VoLTE call to the circuit-switched voice call based on comparison of the predicted VoLTE call quality to the predetermined threshold.

7. The apparatus of claim 2, wherein to estimate the inaccessible information, the at least one processor is further configured to select a subset of the accessible information and characterize the selected subset to estimate the inaccessible information.

8. The apparatus of claim 1, wherein the accessible information of the device information includes at least one of motion sensor readings, battery usage, heat generation, memory usage, a central processing unit state, a screen state, a button response time, or application internet traffic.

9. A method for managing a voice call in a wireless communication network, the method comprising:
collecting crowd-sourced data including a correlation pattern between a voice over long-term evolution (VoLTE) call quality metrics and device contexts, wherein the VoLTE call quality metrics and the device contexts comprise network information and device information;
identifying accessible information based on the device information and the non device network information;
predicting VoLTE call quality using the collected crowd-sourced data and the accessible information; and
determining whether to place the voice call as or switch the voice call to the VoLTE call or a circuit-switched voice call based on comparison of the predicted VoLTE quality to a predetermined threshold.

10. The method of claim 9, wherein predicting the VoLTE call quality further comprises:
generating a prediction model based on the correlation pattern included in the collected crowd-sourced data; and
estimating inaccessible information from the device information based on the accessible information of the device information and the network information.

11. The method of claim 10, wherein estimation of the inaccessible information is performed based on the prediction model using a machine learning algorithm of a machine learning engine.

12. The method of claim 11, wherein the machine learning algorithm is at least one of a support vector machine algorithm and a random forest algorithm that are used for the machine learning engine.

13. The method of claim 10, wherein the inaccessible information of the device information includes at least one of a modulation scheme, a modem power amplifier voltage, antenna operational frequency, signal strength and quality for a user equipment with multiple antennas, and an indication of signal orthogonality.

14. The method of claim 9, further comprising:
switching the voice call from the VoLTE call to the circuit-switched voice call based on comparison of the predicted VoLTE call quality to the predetermined threshold.

15. The method of claim 10, wherein estimating the inaccessible information comprises selecting a subset of the accessible information and characterizing the selected subset to estimate the inaccessible information.

16. The method of claim 9, wherein the accessible information of the device information includes at least one of motion sensor readings, battery usage, heat generation, memory usage, a central processing unit state, a screen state, a button response time, and application internet traffic.

17. A non-transitory computer readable medium comprising program code, that when executed by at least one processor, causes the at least one processor to:
identify collected crowd-sourced data including a correlation pattern between a voice over long-term evolution (VoLTE) call quality metrics and device contexts, wherein the VoLTE call quality metrics and the device contexts comprise network information and device information;
identify accessible information based on the device information and the network information;
generate a prediction of a VoLTE call quality using the collected crowd-sourced data and the accessible information; and
determine whether to place a voice call as or switch the voice call to the VoLTE call or a circuit-switched voice call based on comparison of the predicted VoLTE quality to a predetermined threshold.

18. The non-transitory computer readable medium of claim 17, wherein the program code, that when executed by the at least one processor, causes the at least one processor to generate the prediction of the VoLTE call quality comprises program code, that when executed by the at least one processor, causes the at least one processor to:
generate a prediction model based on the correlation pattern included in the collected crowd-sourced data; and
estimate inaccessible information from the device information based on the accessible information of the device information and the network information.

19. The non-transitory computer readable medium of claim 18, wherein the program code, that when executed by the at least one processor, causes the at least one processor to predict the VoLTE call quality comprises program code, that when executed by the at least one processor, causes the at least one processor to perform prediction based on the prediction model using a machine learning algorithm of a machine learning engine.

20. The non-transitory computer readable medium of claim 17, further comprising program code, that when executed by the at least one processor, causes the at least one processor to switch the voice call from the VoLTE call to the circuit-switched voice call based on comparison of the predicted VoLTE call quality to the predetermined threshold.

* * * * *